(12) United States Patent
Klein et al.

(10) Patent No.: US 7,143,132 B2
(45) Date of Patent: Nov. 28, 2006

(54) DISTRIBUTING FILES FROM A SINGLE SERVER TO MULTIPLE CLIENTS VIA CYCLICAL MULTICASTING

(75) Inventors: Eitan Klein, Afula (IL); Anthony Blumfield, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 733 days.

(21) Appl. No.: 10/159,468

(22) Filed: May 31, 2002

(65) Prior Publication Data

US 2003/0225835 A1    Dec. 4, 2003

(51) Int. Cl.
*G06F 15/16* (2006.01)

(52) U.S. Cl. .................. 709/203; 709/248; 709/204; 709/231; 725/71; 725/91; 725/103; 725/144; 707/10; 455/507; 370/464

(58) Field of Classification Search .............. 705/50; 725/87, 105, 112, 42, 71, 91, 103, 144; 707/104, 707/10; 709/230, 203, 204, 231; 380/255; 455/507
See application file for complete search history.

(56) References Cited

U.S. PATENT DOCUMENTS

| | | | | |
|---|---|---|---|---|
| 5,710,970 | A | * | 1/1998 | Walters et al. ............. 725/87 |
| 7,055,169 | B1 | * | 5/2006 | Delpuch et al. ............ 725/100 |
| 2002/0116510 | A1 | * | 8/2002 | Bacso et al. .............. 709/230 |
| 2002/0138500 | A1 | * | 9/2002 | Bechtel et al. ........... 707/104.1 |
| 2002/0184642 | A1 | * | 12/2002 | Lude e al. ................ 725/105 |
| 2002/0184648 | A1 | * | 12/2002 | Delpuch .................. 725/112 |
| 2003/0026424 | A1 | * | 2/2003 | McGarrahan et al. ....... 380/255 |
| 2003/0068046 | A1 | * | 4/2003 | Lindqvist et al. .......... 380/277 |
| 2003/0135464 | A1 | * | 7/2003 | Mourad et al. ............ 705/50 |
| 2004/0163111 | A1 | * | 8/2004 | Palazzo et al. ............ 725/42 |

OTHER PUBLICATIONS

XU, Rex, X, et al., "Resilient Multicast Support for Continuous-Media Applications", *NOSSDAV* 1997, pp. 1-12.

Lucas, Matthew T., et al., "MESH:Distributed Error Recovery for Multimedia Streams in Wide-Area Multicast Networks", *in International Conference on Communications*, ICC '97, Montreal Canada, Jun. 1997, 6 pages.

Rajagopalan, Bala, "Reliability and Scaling Issues in Multicast Communication", *in Proceedings of the ACM SIGCOMM '92*, pp. 188-198.

Li, Dan, et al., "Oters (On-Tree Efficient Recovery using Subcasting): A Reliable Multicast Protocol", *in Proceedings of the 6th IEEE International Conference on Network Protocols*, Oct. 13-16, 1998, Austin, Texas, 9 pages.

(Continued)

*Primary Examiner*—John Follansbee
*Assistant Examiner*—Dustin Nguyen
(74) *Attorney, Agent, or Firm*—Workman Nydegger

(57) ABSTRACT

A method and system are disclosed for reliably distributing file data from a single server to multiple client computers using a cyclical multicast approach. By "cyclical," it is meant that data is distributed repeatedly onto the network at a certain period. The server transmits metadata asynchronously onto the network via a first communication channel, and file data via a second communication channel. Both data sets are received by one or more client devices operating a data catch module, which listens for metadata and file data from the network via a first and second communication channel. Once the metadata is received, the first channel is disconnected, and the one or more client devices operating the data catch module listen for file data for which the metadata is associated. Any file data not received during one cycle can be received by the client device in a subsequent cycle.

46 Claims, 7 Drawing Sheets

OTHER PUBLICATIONS

ACM SGCOMM *Multicast Workshop*, Aug. 27, 1996, Stanford University, Stanford, CA, retrieved from http://gaia.cs.umass.edu/sigcomm_mcast/index.html on Jul. 8, 2004 12 pages total.

Yeung, Donald, "Scalability of Multicast Communication over Wide-Area Networks", Laboratory for Computer Science, Cambridge, MA 02139, Apr. 24, 1996, pp. 1-21.

Hofmann, M. "Skalierbaree Multicast-Kommunikation in Weitverkehrsnetzen" (Scalable Multicast Communication in Wide Area Networks), (in German) *Ph.D. Thesis at University of Karsruhe, Germany*, published by Infix Verlag, DISDBIS, vol. 42, ISBN 3-89601-442-0, Feb. 1998 (Summary of article attached).

* cited by examiner

DISTRIBUTING FILES FROM A SINGLE SERVER TO MULTIPLE CLIENTS VIA CYCLICAL MULTICASTING

TECHNICAL FIELD OF THE INVENTION

The present invention relates generally to information distribution over a network, and more particularly to methods and systems for distributing a file to multiple clients using an IP multicast.

BACKGROUND

In a network environment, such as a local area network (LAN) or intranet, it is often necessary to transmit large blocks of data from a single server computer to multiple client computers simultaneously. For example, a file server—a computing device used for storing and distributing files and data—may be used to deploy and install a software application onto multiple client computers within a LAN. By distributing the software application via the network using the file server, the need for manually installing the software application on each computer is virtually eliminated. The same economies and savings attach to the distribution of other types of data in this manner as well. This significantly reduces the time and expense associated with disseminating data on a large scale.

For effective operation, the file server that transmits data to multiple client computers must be able to handle multiple network connections. In fact, to transmit the same data simultaneously to n computers, the file server must form at least n connections. So, for example, if there are ten client computers to which data is to be transmitted, the file server must establish ten connections—at least one connection to each client computer. The size of the file to be transmitted over each connection, as well as the number of connections n, ultimately determines the rate at which the transfer can be completed by the file server. Hence, the maximal rate of data transfer for the file server, sometimes known as the bandwidth capacity, has to be high enough to accommodate multiple connections and reasonably large file sizes.

Because of limited file server bandwidth capacity, however, there are inherent drawbacks to the method of data transmission discussed above. In particular, the ability of the file server to transmit file data is considerably impeded when the number of computing devices n, for which at least n connections are to be formed, is significant. Consider, for example, a scenario wherein the bandwidth capacity of a file server is 10 Mbps (megabits per second), and the file data to be transmitted is 10 MB. If the file server transmits the file data to a single client computer, only a single connection need be formed, and the file data is transferred in one second at 10 Mbps, the full bandwidth capacity of the server. However, if the number of clients is ten, ten connections must be established, and the 10 MB file is transferred in 10 seconds over each connection at a rate of only 1 Mbps. The relationship between the number of clients and the rate of transfer over a connection with respect to the bandwidth capacity is given as follows:

Total amount of data to be transferred=number of clients×file size

Actual bandwidth required=Total amount of data to be transferred/sec

The amount of bandwidth actually required is the rate at which the file will be transferred over one connection multiplied by the number of connections to be serviced. As the number of clients increases, the required bandwidth increases while the ability to transfer a copy of the data at full bandwidth capacity erodes. Likewise, if the size of the file data increases, the same diminishing effects on the bandwidth capacity of the file server occur. In either case, the reliability of the data transfer process can be impacted as well.

SUMMARY

To address the challenges described above, a method and system are disclosed for reliably distributing file data from a single server to multiple client computers using a cyclical multicast. Similarly, a method and system for distributing file data to multiple client devices without prior knowledge of the number of clients or their locations on a network is presented.

In accordance with an embodiment of the invention, a file server operates a data cast module for distributing metadata and file data onto a network in a cyclical fashion. The datacast module is preferably an executable module such as a stand alone executable or otherwise (e.g. a dynamic link library (DLL)), having instructions for transmitting file data onto the network in cycles via a multicast protocol, such as reliable or non-reliable IP multicast. The term executable as used herein refers to a computer executable routine or section of code or instructions, whether or not the executable entity is capable of independent operation. By "cyclical," it is meant that data is distributed onto the network in cycles, or periods, over a network connection. Each full transmission cycle is completed once the server distributes a complete set of data, be it file data or metadata, onto the network. For a receiver of the data transmitted by the server, such as a client device, a full cycle is complete once that recipient receives all of the data in its entirety. Following the completion of a full transmission cycle, another transmission cycle may be commenced immediately, or after a designated time interval.

In operation, the file server creates a table or list of metadata to be transmitted asynchronously to the one or more client computers via a first communication channel. The metadata is any data that indicates properties associated with file data to be transmitted to the one or more client computers, such as the size or format of the file data, the file name, error correction information, etc. The actual file data associated with the metadata is transmitted onto the network by the file server via a second communication channel, and may be any information that comprises a full data file. This includes for example, but is not limited to, packets or bytes of information that comprise a video or audio file. Once the metadata table is compiled, the datacast module transmits the metadata via the first channel, and continues to transmit the metadata periodically in cycles. Also, having generated the table of metadata, the file server operates the datacast module to transmit file data via the secondary channel. The file data is also transmitted in continuous cycles onto the network.

In accordance with another embodiment of the invention, one or more client devices operating a data catch module are able to receive metadata and file data over the network via the first and second communication channels. Specifically, the data catch module is a stand-alone executable module, or otherwise, that operates on each client for detecting and receiving (listening for) information transmitted via the first and second channels. In operation, the data catch module for each client device listens for any metadata that is transmitted on the network by the file server via the first channel. Once the metadata is detected, the one or more client devices store the metadata into an accessible storage area. Because the metadata is transmitted in a cyclical fashion, a client can begin receiving the metadata at any point within a transmission cycle and continue receiving information until the entirety of the metadata is received. If the client began receiving the metadata at some point other than the beginning of the cycle (e.g., client began listening during the halfway point of a cycle), the client continues to listen during a subsequent cycle, or longer, in order to receive any missed metadata.

Once the metadata is received in full by the data catch module, the first channel connection to the network is closed, and the data catch module listens for file data transmitted onto the network via the second channel. As the file data is received, the data catch module reviews the cyclic redundancy check (CRC) data, which is maintained as part of the metadata to ensure that the file data is received without transmission error. If the CRC data indicates the file data is without transmission error, then the file data is stored by the client device in an accessible storage location, such as in memory 44 as shown in FIG. 1. If, however, the CRC data indicates that the received file data contains transmission errors, then the data catch module determines whether a complete cycle of file data has been transmitted (information maintained as part of the metadata). When the received file data is incomplete (e.g., when a client did not receive all file data correctly or in its entirety), the data catch module prompts the client to listen again for file data via the second communication channel. If the complete set of file data has been received, however, all of the file data is stored and the second communication channel is closed after checking for transmission errors. Because all relevant data is transmitted over the network cyclically, multiple clients may receive the file data at anytime without requiring a significant number of connections to be formed with each client by the server. All connections required for receiving the file data and associated metadata are initiated and terminated by the client devices themselves, as opposed to the server.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention and its advantages may be best understood from the following detailed description taken in conjunction with the accompanying drawings, of which:

DETAILED DESCRIPTION

Figure 1:
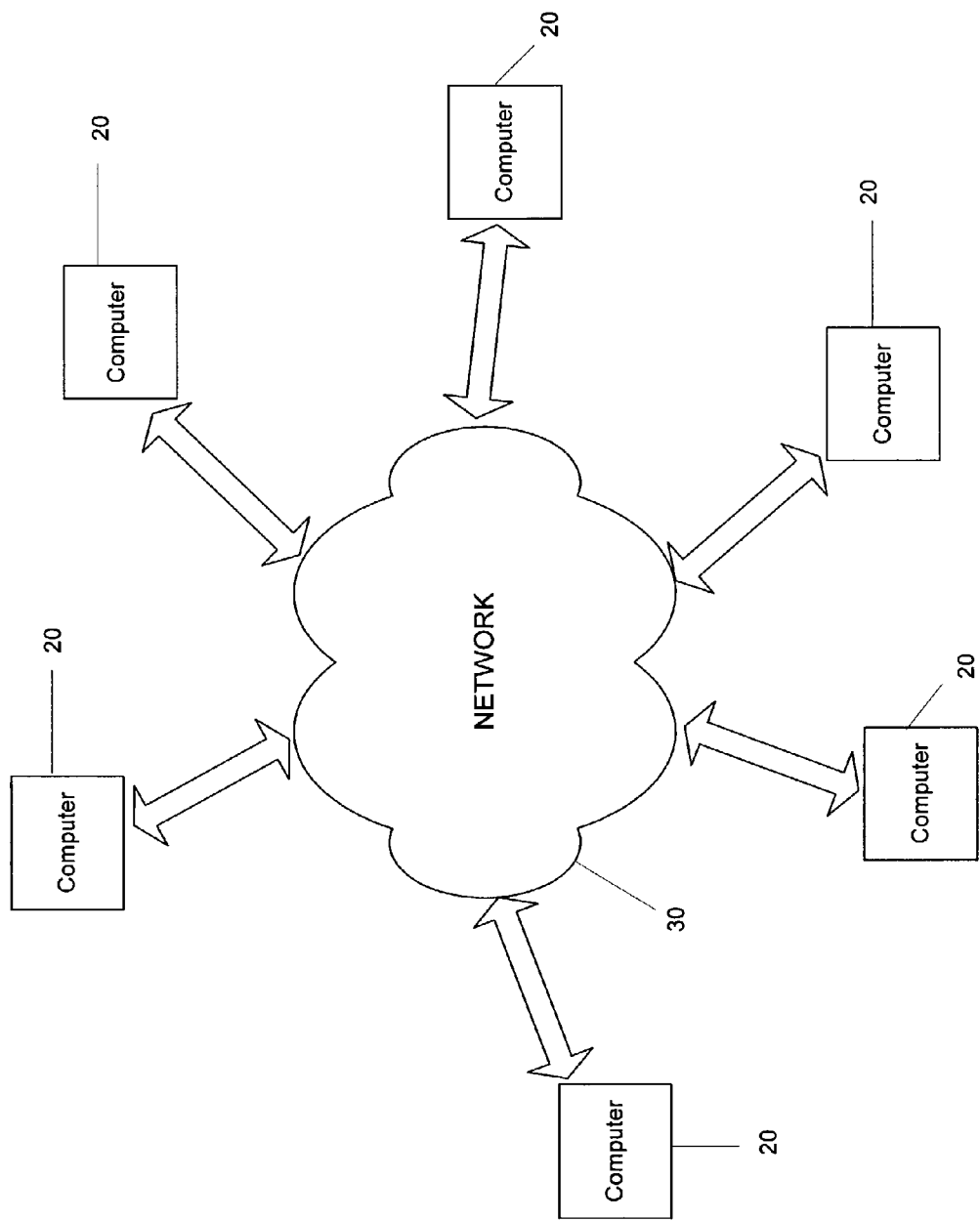
FIG. 1 is a schematic diagram of an exemplary computer network.

The invention relates to a method and system for reliably distributing file data from a single file server to multiple client computers using a cyclical multicast approach. Also, a method and system for distributing file data to multiple client devices without prior knowledge of the number of clients or their locations on the network is presented. As is well known in the art, multicast is a process whereby a single message or select set of data is transmitted to a group of recipients, rather than to a single recipient. A simple example of multicasting is sending an e-mail message to one or more users specified in a mailing list (e.g., the send to and carbon copy (cc:) feature of most e-mail utilities). Teleconferencing and videoconferencing techniques also often use multicasting, but require more robust protocols and networks. Standard protocols for supporting multicasting include, but are not limited to, IP Multicast, Reliable Multicast and the Real Time Transport Protocol (RTP). Note that the invention does not require the use of reliable multicasting techniques. It will be recognized by those skilled in the art that numerous protocols exist for multicasting, and that the invention is not limited to any particular protocol or multicast implementation.

Also, as described herein, a file server is a computing device that is capable of operating on a network for storing, distributing and transferring files and other data. Generally, the file server acts in a dedicated capacity, meaning it serves no other role than for the storage and distribution of network resource information. Any client device having access to the file server, such as via a network connection, can store files on the file server and/or retrieve stored data. Throughout the course of the detailed description, general reference will be made to a file server as an exemplary computing device for performing the mechanisms of the invention for transmitting data onto a network. However, those skilled in the art will realize that a file server is only one type of computing device usable for transmitting file data, and that any computing device having facilities for communicating data via a network is usable within the scope of the invention. Indeed, in the context of the invention, the term "file server" refers to any serving device operable in conjunction with a network.

A complete set of "file data," which is referred throughout the detailed description, is any data or information that comprises a full data file. For example, file data may include, but is not limited to, data bits, data bytes, or packets of data that comprise a file or collective data set, such as a program file, text file, directory file, etc. Likewise, file data can be one or more individual files that when combined, comprise a complete data file or group, or that comprise a message. In the context of the invention, file data includes any primary information that is the target or subject of a desired network or computing task or operation. So, for example, if a client device wishes to engage in a video teleconference, then it must receive primary information such as the audio and video data packets required to engage properly in the session. Similarly, when the task is a file transfer, the data comprising the transferred file is the file data.

In contrast to the file data, "metadata" refers to secondary information that is associated with the file data, and useful for relaying administrative information to a recipient device pertaining to the file data. More specifically, the metadata indicates various properties associated with the file data, such as the size or format of the complete set of file data, the file name assigned to the file data, error correction information, etc. Recipients of metadata can generally use this information to determine how, when and by whom a particular set of data was collected, as well as how the data is formatted.

Referring now to FIG. 1, an example of a networked environment in which embodiments of the invention may be used will now be described. The example network includes several computing devices 20 communicably linked with one another over a network 30, such as the Internet, as represented in the figure by a cloud. Network 30 may include one or more well-known components, such as routers, gateways, hubs, etc. and may allow the computers 20 to communicate via wired and/or wireless media.

Figure 2:
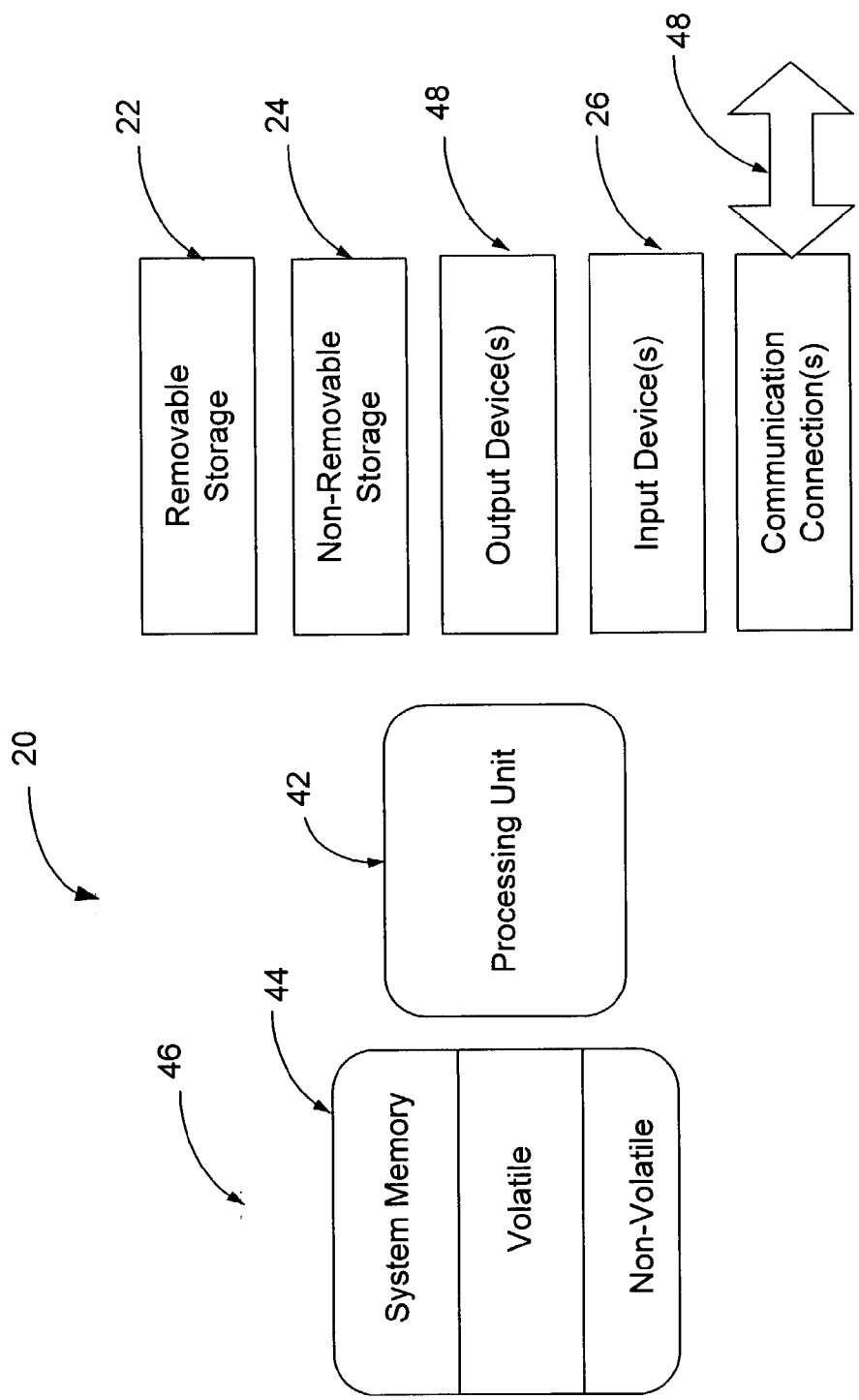
FIG. 2 is a schematic diagram illustrating the architecture of an exemplary computing device for operating within the exemplary network.

Referring to FIG. 2, an example of a basic configuration for a computing device on which the system described herein may be implemented is shown. In its most basic configuration, the computing device 20 typically includes at least one processing unit 42 and memory 44. Depending on the exact configuration and type of the computer 20, the memory 44 may be volatile (such as RAM), non-volatile (such as ROM or flash memory) or some combination of the two. This most basic configuration is illustrated in FIG. 2 by dashed line 46. Additionally, the computing device may also have other features/functionality. For example, computer 20 may also include additional storage (removable 22 and/or non-removable 24) including, but not limited to, magnetic or optical disks or tape. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to stored the desired information and which can be accessed by the computing device 20. Any such computer storage media may be part of the computing device 20.

The computing device 20 preferably also contains communications connections 48 that allow the device to communicate with other devices. A communication connection is an example of a communication medium. Communication media typically embodies readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. The term computer readable media as used herein includes both storage media and communication media.

The computing device 20 may also have input devices 26 such as a keyboard, mouse, pen, voice input device, touch input device, etc. Output devices 48 such as a display, speakers, a printer, etc. may also be included. All these devices are well known in the art and need not be discussed at length here.

Figure 3:
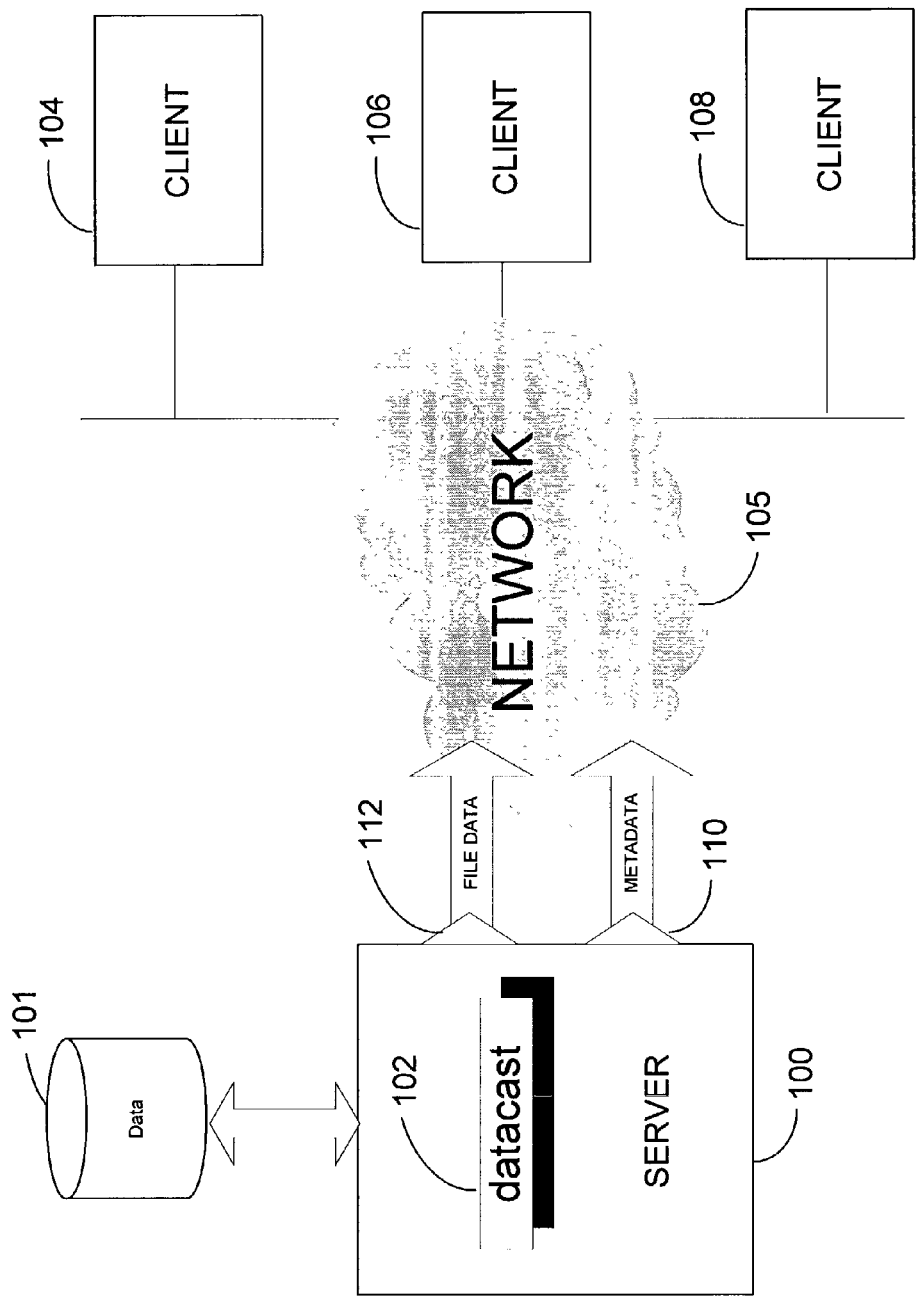
FIG. 3 is a schematic diagram illustrating a file server in communication with a plurality of clients according to an embodiment of the invention.

In accordance with an embodiment of the invention, a file server 100 operates a data cast module 102 for distributing metadata and file data onto a network 105 in a cyclical fashion to one or more client computing devices 104–108. This embodiment of the invention is illustrated in FIG. 3 and with respect to the flowchart of FIG. 5. The datacast module 102 is an executable, such as a dynamic link library (DLL), having instructions for transmitting file data onto the network 105 in cycles via a multicast protocol. By "cyclical," it is meant that data is distributed over the network 105 in cycles, or periods, via a network connection. A full transmission cycle is completed once the server 100 distributes a complete set of the relevant file data or metadata over the network 105. With respect to a recipient of file data or metadata, such as client devices 104–108 that listen for data via a network connection, a full cycle is complete once that recipient receives all of the data in its entirety. Following the completion of a transmission cycle, another transmission cycle may be commenced immediately, or at a designated time interval. The periodicity of transmission cycles may vary, depending on the size of the file and amount of file data being transmitted, the traffic and congestion within the network 105, the processing capabilities of the file server 100 or client devices 104–108, and other such factors. Because the server 100 transmits data in a cyclical manner, each of the client devices 104–108 can retrieve the data at different times/rates. As a result, one or more of the client devices may need to listen through two or more cycles until receipt of all of the data is complete. Only when a client has received all the data correctly will it stop listening to the cyclic data transmission.

As an example of this technique, consider a situation in which the file server 100 transmits 100 blocks of file data over the network 105 in a cyclic manner. A client device 104 starts listening to the channel in the middle of a cycle of the cyclic transmission and completes one full cycle, i.e. the second half of the present cycle followed by the first half of the subsequent cycle. However, due perhaps to network problems or insufficient resources on the client 104, only 80 blocks were received correctly by the client 104 during two complete transmission cycles. The client 104, realizing that it still has data missing, continues to listen to the cyclic transmission, collecting the missing pieces of data. Only when the client 104 has received all the data correctly and in its entirety will it stop retrieving the file data. The same technique applies to the receipt of metadata.

The file server 100 utilizes IP multicast to transmit file data and metadata over the network 105. In particular, the file data (and optionally the metadata) can be stored onto the server 100 into an accessible storage location 101 for later transmission using a messaging technology. Such technologies enable different types of data to be communicated by the server 100 at different times across heterogeneous networks. The server 100 can send file data, or send messages to queues and read messages from queues. Furthermore, they can be used transmit data both asynchronously and synchronously across the network 105.

While message queuing techniques can be useful for providing advanced messaging capability, those skilled in the art will recognize various forms of messaging technologies are suitable for usage with respect to the invention. These include, but are not limited to, Geneva XIPC, which is commonly used in UNIX based systems, and MQSeries developed by IBM. Or, as an alternative to intermediate messaging programs, the server 100 may also directly use multicast networking APIs or function calls to implement message queuing and processing. Accordingly, the invention is not limited to any one implementation.

Both the file data and metadata are retrieved from an accessible storage location 101 for subsequent transmission. The file data and metadata may be stored separately or together, on one storage medium, two, or more. The datacast module 102, operating on the server 100 has control over two communication channels, or connection ports, for transmitting data, namely a first communication channel 110 and a second communication channel 112. The first communication channel 110 is used to transmit metadata, while the second communication channel is used to transmit file data. Each channel 110 and 112 is preferably configured to the network via its own port settings and according to specific connection characteristics.

Figure 4:
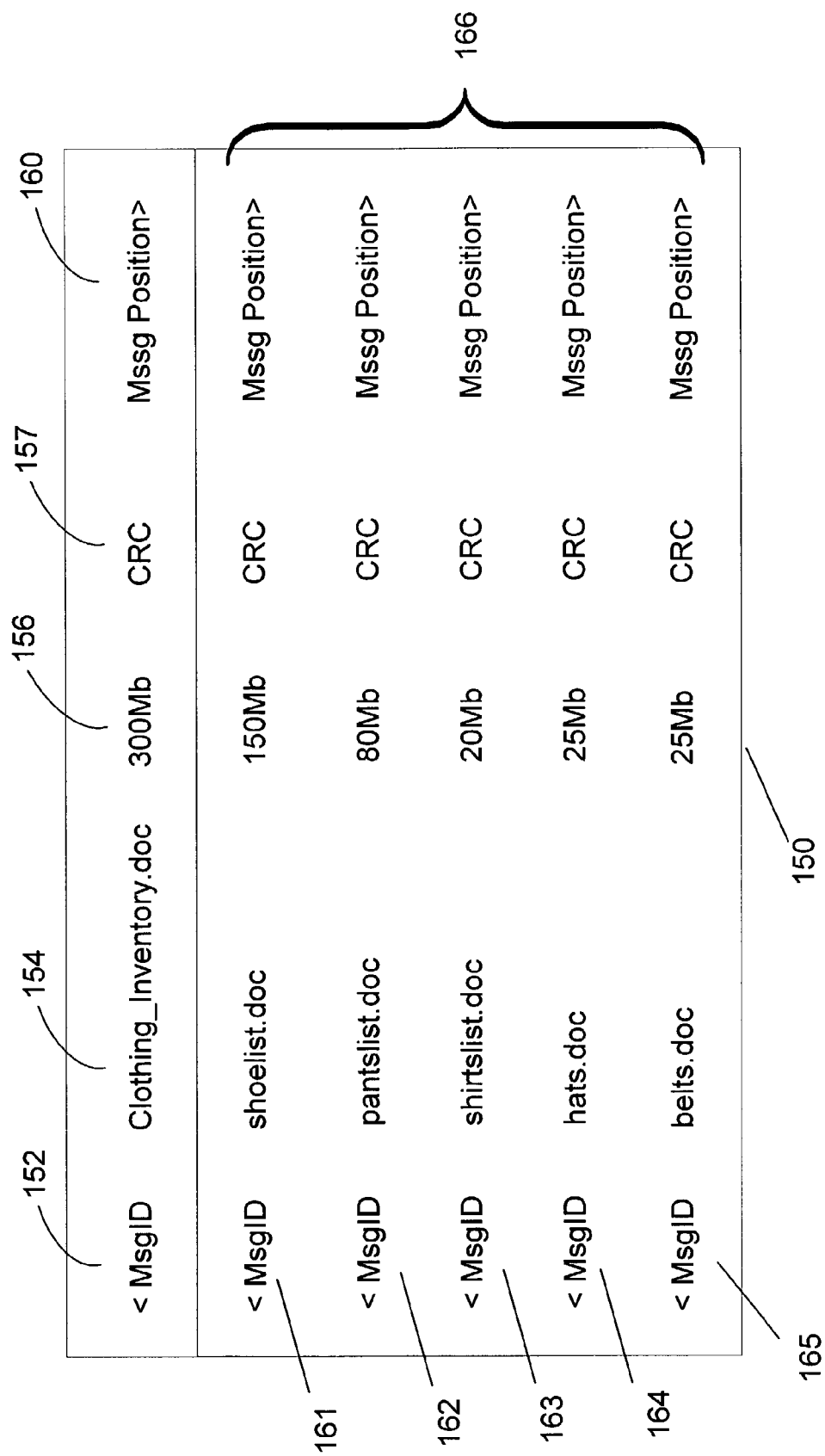
FIG. 4 is a tabular diagram illustrating metadata information received by one or more client devices via a first communication channel according to an embodiment of the invention.

Once the file data is stored via the storage medium 101, the server process of server 100 invokes or executes the datacast module 102 in order to create a table or list of metadata associated with the file data. This action corresponds to event 200 of FIG. 6*a*. The table of metadata is created by the server 100 before any file data is transmitted onto the network to ensure that the file data can be properly received and reconstructed by any listening client devices, as will be discussed hereinafter. An example of a metadata table in relation to a complete set of file data, designated by the name "clothing_inventory.doc," is illustrated in FIG. 4 in accordance with an embodiment of the invention.

As shown, the metadata 150 illustrated in tabular form includes relevant information pertaining to the characteristics of "clothing_inventory.doc." This includes a message identification (MsgID) 152 for uniquely identifying the metadata, the file name 154, the file size 156, the cyclic redundancy check (CRC) information 157 and the position of the message within the file 160. Information of this nature is also provided in the metadata table 150 for each individual file that comprises clothing_inventory.doc. Hence, the files that comprise the complete file data—namely shoelist.doc 161, pantslist.doc 162, shirtlist.doc 163, hats.doc 164 and belts.doc 165—all have associated metadata information 166. Other information may also be included as part of the metadata 150 as required by a specific application or processing need. In general, the metadata 150 provides information associated with the file data to permit the proper handling of the file data when it is received.

The full metadata set 150 can be encapsulated in a single data packet, and transmitted onto the network via the first communication channel. In this case, a recipient of the metadata 150 receives the full metadata information pertaining to the file data (clothing_inventory.doc) in one action. Alternatively, the metadata 150 can be transmitted onto the network via several packets or messages. So, for example, the metadata associated with each individual file that comprises clothing$_{13}$ inventory.doc (e.g., shoelist.doc, hats.doc) can be sent as separate packets. Any of the many known mechanisms for packetizing data for transmission onto the network may be utilized for file data and metadata transmission within the scope of the invention.

Referring again to the illustrated embodiment of FIG. 3, once the metadata table is created, the metadata is transmitted asynchronously over the network 105 via the first communication channel 110. This corresponds to event 204 of the flowchart of FIG. 6*a*. At this time, the file data may also be transmitted over the second channel 112, corresponding to event 202. The file data is transmitted in continuous cycles over the second channel 112, wherein the number and frequency of cycles can be regulated and set, such as by the network administrator of the file server 100. Only a single connection is required to transmit the file data as opposed to multiple connections. Similarly, only a single connection is required to transmit the metadata. Note that the file data and metadata may be transmitted simultaneously, or at different times, given that they are transmitted over different channels. Also, their transmission cycle periods need not coincide even approximately.

Figure 5:
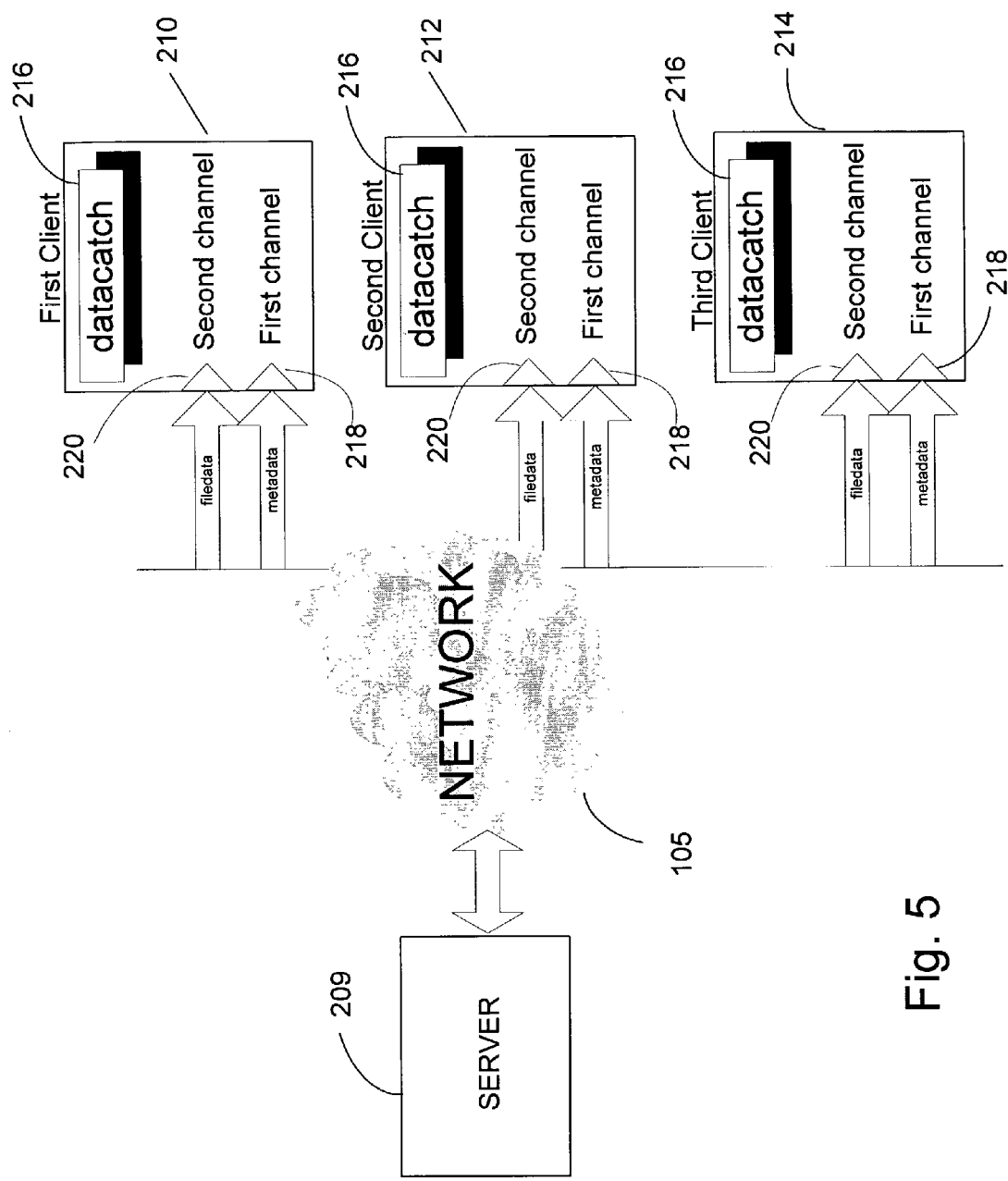
FIG. 5 is a schematic diagram illustrating a plurality of client devices receiving file data from the network in accordance with an embodiment of the invention.

In accordance with another embodiment of the invention, one or more client devices 210–214 operating a data catch module 216 receive metadata and file data from the network 105 via first and second communication channels 218 and 220 respectively, as illustrated in FIG. 5. Specifically, the data catch module 216 is an executable module that operates on each client for detecting incoming data and for receiving data. The process of detecting incoming data from the network is referred to as listening, and is enabled by the data catch module at each client via a queuing mechanism. In the illustrated embodiment, each client 210–214 hosting a data catch module 216 creates two queues, one for operating in connection with the first communication channel 218 and one for operating in connection with the second communication channel 220. Each queue can be checked, and its state used to indicate when data has been received completely (e.g., when a client has obtained the metadata or file data in its entirety).

Figure 6B:
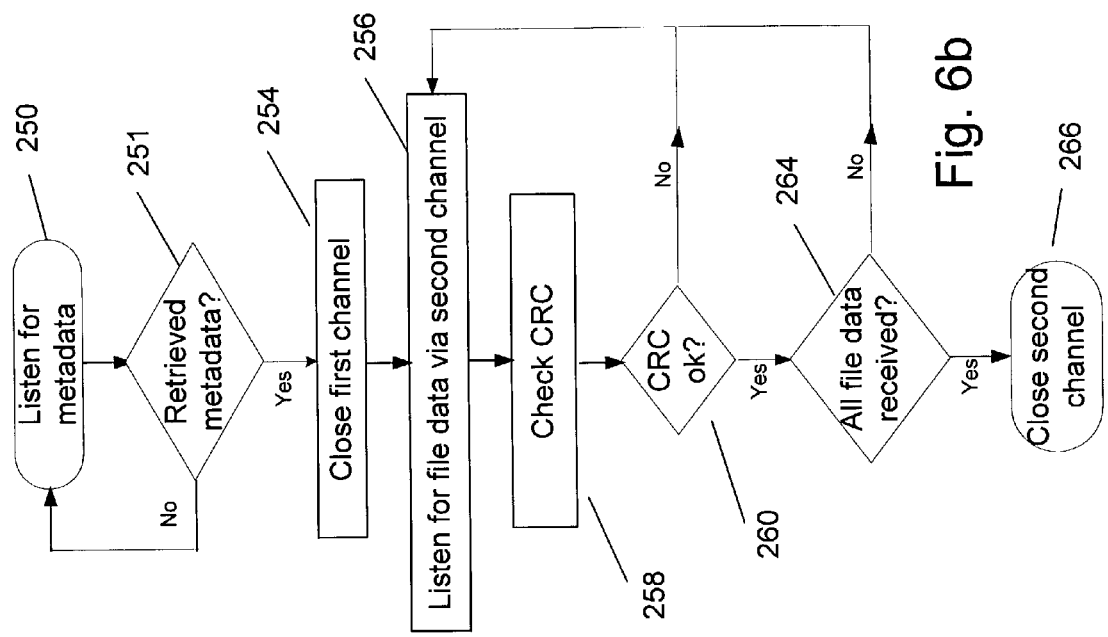
FIG. 6b is a flowchart illustrating the operation of a client device for receiving data from a network in accordance with an embodiment of the invention.
Figure 6A:
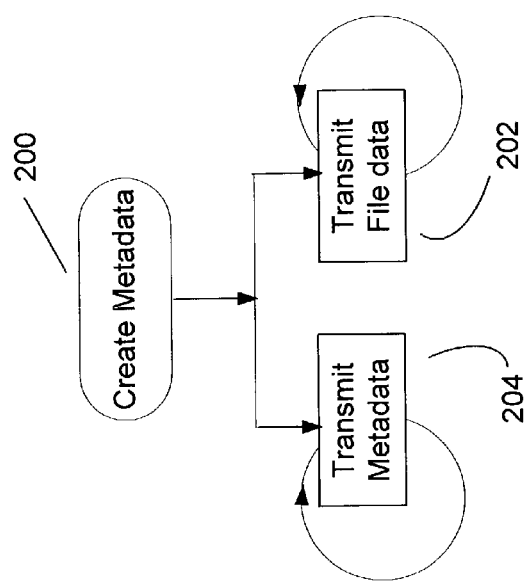
FIG. 6a is flowchart illustrating the operation of a file server for transmitting data onto a network in accordance with an embodiment of the invention.

Once the queues are established, the data catch module 216 hosted on each client listens for any transmitted metadata via the first channel 218, as shown in event 250 of FIG. 6*b*. Upon detecting incoming metadata the client device 210–214 stores the metadata in an accessible storage location for subsequent use. Because the metadata is transmitted cyclically by the server 209, each client can receive the metadata at any point within a cycle and can continue receiving information until all relevant data is received. So, for example, if a client device 210 did not begin listening for metadata at the start of a cycle, but rather began receiving metadata midway through a cycle, the client 210 can listen in another cycle or cycles to receive any missed or defective metadata. Moreover, because each device receives the metadata independently of the other (e.g., each listens for metadata via its own first channel 218), each device retrieves the metadata asynchronously without limiting the other. Note that in the absence of interruption or other error, it should generally not take a client more than two cycles to receive a full set of either file data or metadata.

When the metadata is received completely, the queue associated with the first channel connection 218 is triggered, and the first channel connection 218 to the network 105 is closed as shown at event 254. This effectively restricts the client device 210 from listening for any more metadata. Alternatively, the client device 210 may keep the first channel connection 218 active so that it can periodically listen for metadata to detect whether the server 100 has began transmitting a new set of file data. As such, if the client receives new metadata associated with new file data being transmitted by the server 209 before the client device 210 has completely received the original set of file data, the data catch module instructs the client to abort its listening process for the original file data. The client device 210 then begins receiving the new metadata and new file data. Note that aborting the listening process for the original file data is not required, and the client may instead choose not to abort.

In any case, once the relevant metadata has been received in its entirety, the data catch module 216 operating at the client listens via the second channel 220 for file data transmitted on the network, as depicted at event 256. Again, a client can receive the data at any point along a cycle, and can wait for a subsequent cycle to obtain any file data it missed. In this case, the client can refer to the message identification and message number properties specified in the metadata to determine which file data it still needs to receive.

As the client receives the file data via the second communication channel 220, the data catch module 216 uses the CRC data maintained as part of the metadata to ensure that the file data is received without error as shown at event 258. If the CRC data indicates that the file data has errors, as checked at event 260, the client device does not store the file data. Instead, the data catch module 216 prompts the client to continue listening for file data via the second communication channel 220 at event 256. In this way, the client can receive the data during a subsequent cycle of file data transmission in an effort to mitigate the receipt of erroneous or incomplete. If, however, the CRC data indicates the file data is without error, then the client device stores the file data, and then checks to see whether the file data has been retrieved in its entirety (e.g., full cycle complete), as shown at event 264. If a complete cycle has yet to be carried out, the data catch module 216 operating at the client continues to listen for file data via the second channel 220 as shown in event 256. Once a full cycle has been received, the queue associated with the second channel is triggered, prompting the data catch module 216 to close the second communication channel at event 266.

Those of skill in the art will appreciate that the invention allows any number of client devices to receive file data without limitation. This is because each of the client devices can operate its first and second channels independently of other clients' communications channels, which ensures that no one device imposes any processing or connection state issues on another device. As such, the transmission bandwidth of the server 209 does not depend on the number of listeners currently listening for the file data. Furthermore, the server 209 does not need to have advance knowledge of the number of clients it is serving in order to transmit data to a plurality of clients. This is in direct contrast to conventional file distribution mechanisms, wherein the server is required to formulate as many connections as there are clients in order to transmit data to multiple clients simultaneously. In this latter case, the reliability of the data transfer is compromised due to the heavy load placed upon the server, and the significant bandwidth required.

Also, it will be appreciated that the invention ensures that no client's ability to retrieve data from the network 105 is compromised because of the lesser processing capabilities of another client. This problem is commonplace in situations where there are multiple clients listening on the network, all of which employ varying network connection rates and operating speeds. For example, if the second client device 212 processes information at a much slower pace than the first and third devices 210 and 214, the ability of the first and third devices to retrieve data at higher rates is not jeopardized within embodiments of the invention, since each device operates at its own pace in a non-synchronized fashion, and simply disconnects itself from the process (closes the communication channel) upon receiving a complete data set.

An alternate embodiment of the invention contemplates a mode of operation by the data catch module for allowing a client device to accept some file data, while rejecting other file data. Specifically, when a client device receives metadata information associated with a particular set of file data, it is able to determine the properties of the file data, including the identities of various separate files that may together comprise the file data. As such, the data catch module uses the metadata to distinguish between the different file data received via the network, and makes decisions as to how to treat the data. So, for example, if a data catch module operating on a first client is instructed (e.g., by the user of the client device) to receive only text files, but the file data includes text and video, the first client only stores the text data while rejecting any video file data.

As another example, consider a scenario wherein multiple clients connected to the network via first and second communication channels detect incoming video file data from the network. While each client is able to retrieve the data in the manner previously described, each may employ a different type of software for processing the data or may only be able to recognize specific data formats. For example, some client devices may only be able to process MPEG video data while other devices can only process QuickTime data. In accordance with the alternate embodiment, the data catch module operating on each client device detects the file data pertaining to the format that the client device supports, and rejects any file data that is unsupported or undesired. The data catch module makes this determination by analyzing the metadata information, which reveals the relevant properties of the separately received file data. Thus, if the client device will not process or use certain file data being transmitted, the data catch module can intelligently neglect such data. In this way, the client device conserves processing resources and memory space by acquiring only the data it can process, rather than storing the data in its entirety.

The data cast module 102, which is hosted on a transmitting device, and the data catch module 216, which is hosted on a listening device, are preferably operable according to a command reference. The command reference can be executed automatically by the transmitting device or listener such as with a script file, or can be entered manually by a user of the device from a command interface. An exemplary syntax for controlling and initiating the functionality of the datacast and datacatch modules is shown below with respect to TABLES 1 and 2.

The datacast module has the following command-line syntax in an embodiment of the invention:

Datacast source_file_path\file/multicast:IP_address
        [/S] [/V]

In TABLE 1, shown below, the parameter values and corresponding meanings for this command line syntax are shown. It should be noted that no parameter or value is specified to the datacast module via the command reference for indicating the number of clients that are to be communicated with, or their whereabouts on the network. Likewise, there is no parameter for indicating the number of connections to be established for transmitting data. Again, the datacast module 102 operates independently of the number of clients involved in the communication, and their relative locations on the network. Likewise, the datacast module 102 functions such that advance knowledge of the number of connections or clients involved in the communication are not required.

TABLE 1

Syntactical values and meanings for the datacast module

| Parameter or switch | Meaning |
| --- | --- |
| source_file_path | Specifies the path to the file(s) to be copied on the file server. |
| file | Specifies the file(s) to be copied. Wild cards can be used. |
| /multicast:IP_address | Specifies the IP multicast address. |
| /S | Copies all subfolders, except subfolders, and the applicable files in all subfolders. |
| /V | Displays file-by-file progress as the files are transmitted in each cycle. |

As an example of the datacast command-line syntax described above, consider a scenario in which the server on which the datacast module 102 operates is to transmit all the files in a folder called MyFolder to a plurality of clients. The clients, or listeners, are configured to the network via the IP multicast address 234.1.1.1. In this case, the command line reference required for initiating the transmission is given as:

MQcast.exe c:\MyFolder\*.*/multicast:234.1.1.1/s

The data catch module 216, on the other hand, has the following command-line syntax:

MQcatch destination_folder/multicast:IP_address

In TABLE 2, the parameter values and corresponding meanings for this command line syntax are shown.

TABLE 2

Syntactical values and meanings for the data catch module

| Parameter or switch | Meaning |
| --- | --- |
| destination_folder | Specifies the folder into which the files will be copied on the client. |
| /multicast:IP_address | Specifies the IP multicast address. |

In keeping with the syntax above for the datacast module 102, if a client or listener wanted to store all transmitted data files into a local folder, the following example command-line reference could be used:

MQcatch.exe Local Folder/multicast:234.1.1.1

The first and second communication ports or channels for receiving metadata and file data respectively are hard-coded in this case. Port 1 corresponds to the receiving of file data, while port 2 corresponds to the receiving of metadata.

Indeed, other parameter types and values besides those shown in TABLES 1 and 2 above may be implemented without limitation within the scope of the invention. Likewise, the syntax shown above can easily be manipulated by those of skill in the art to correspond to different operating systems, without jeopardizing the functionality of the datacast 102 or datacatch 216 modules. Those skilled in the art will recognize that the syntax illustrated and described above is exemplary, and is only one syntactical command reference suitable for usage with respect to the invention.

The invention has been described above with respect to the operation of a server for distributing data onto the network in a cyclical fashion. Also, the invention has been described with respect to the actions of one or more client devices detecting and retrieving the cyclically distributed data via the network. While various protocols for ensuring the delivery of IP multicasting are known in the art, the following paragraphs will describe the utilization of the Pragmatic General Multicast (PGM) within an embodiment of the invention. Those skilled in the art will recognize, however, that other protocols for transmitting and delivering IP multicast data exist, and are contemplated within the scope of the invention. As such, the invention does not require the use of PGM. In any case, PGM need not be used in conjunction with MSMQ, although if the invention is implemented via the implementation of PGM within the WINDOWS XP brand operating system by MICROSOFT, the interface to the PGM functionality is via MSMQ. However, note that any other operating system, PGM implementation, or non-PGM multicast technique may be used to implement embodiments of the invention.

PGM improves significantly over previous end-to-end reliable protocols that make use of Internet Multicast. PGM pertains not only to end system components, but also to router elements. PGM primarily represents a way to overcome problems inherent in prior attempts to scale existing protocol reliability techniques such as ACK, NAK, and retransmission when operating them within IP Networks that may have sporadically high loss characteristics. PGM is generally optimized for applications involving the interfacing of one entity to a plurality of entities, although it can also be used for other types of interactions, particularly when multiple sessions are used. As such, it is a simple, scalable and efficient protocol well suited for multicast applications requiring some base level of reliability.

Figure 7:
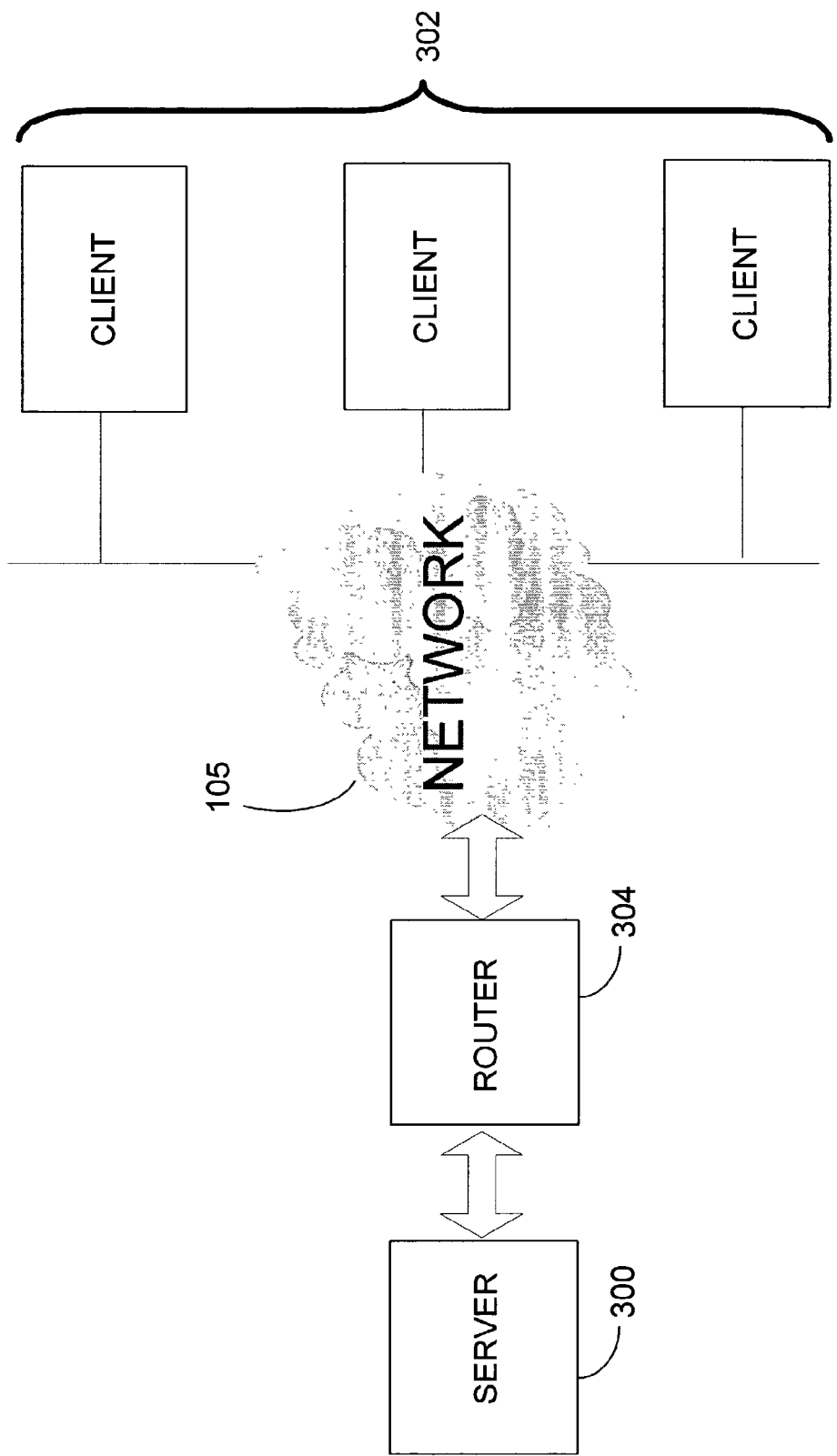
FIG. 7 is a schematic diagram illustrating an embodiment of the invention for transmitting data onto the network by the file server via Pragmatic General Multicast.

In accordance with the alternate embodiment of the invention, a server device 300 transmits data onto a network using Pragmatic General Multicast (PGM) to multiple clients 302, as illustrated in FIG. 7. To implement the PGM protocol, a PGM enabled router device 304 is employed upon the network for routing data appropriately to the one or more devices 302. An advantage of implementing PGM via the PGM enabled router 304 versus using a traditional multicast protocol is that PGM maintains a store of some or all of the data packets transmitted or retransmitted (depending on storage capacity of the router). This enables a client listening in the group 302 to acquire data packets directly from the router 304 versus waiting for another cycle to be commenced by the server 300. Moreover, PGM allows each client to more easily detect unrecoverable data packet loss. When file data is transmitted onto the network 105 and determined to be lost or unrecoverable, the clients 302 can request the missing data from the PGM enabled router device 304 directly as opposed to waiting for another cycle of data to be completed by the server 300. As such, data can be retrieved more swiftly by the client devices 302 without requiring any interruptions of the current transmission cycle of the server 300.

In operation, the router 304 prevents the transmission of data onto the network 105 when no clients 302 are listening for file data or metadata. In this way, data is only transmitted onto the network 105 when required by a listening client, as opposed to the data being cycled continuously. This significantly reduces the amount of traffic and congestion on the network 105, and minimizes the processing requirements of the server 300 in distributing information to the clients 302. Still further, PGM is designed to function even in the presence of network elements that have no knowledge of PGM. So, if a non-PGM enabled router 306 receives file data transmitted onto the network via the PGM enabled router 304, no loss of functionality occurs.

While the illustrated alternate embodiment suggests the utilization of a PGM router, those skilled in the art will recognize that other routers and routing protocols besides PGM may be used to implement multicasting, and accordingly, the invention is not limited to any one implementation. In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that the elements of the illustrated embodiments shown in software may be implemented in hardware and vice versa or that the illustrated embodiments can be modified in arrangement and detail without departing from the spirit of the invention. Furthermore, those of skill in the art will recognize that the invention is widely applicable to any scenario wherein data is to be distributed to multiple clients over a network. Therefore, the invention as described herein contemplates all such embodiments as may come within the scope of the following claims and equivalents thereof.

What is claimed is:

1. In a network that includes a server maintaining first and second communication channels with each of multiple client devices, a method for cyclically transferring file data from the server to the multiple client devices such that the client devices can determine the completeness of received file data, the method comprising:
    creating a set of metadata specifying properties associated with the file data, wherein the properties include at least error correction information for the file data, and wherein the error correction information is configured for use by a client device, after transmission of the file data from the server, to determine the completeness of the file data;
    transmitting the set of metadata over the network from the server to the multiple client devices in cycles via the first communication channel, each cycle comprising a full transmission of the set of metadata and being repeated periodically while and until it is determined that no client device of the multiple client devices has not yet received in full the set of metadata; and
    transmitting the file data over the network from the server to the multiple client devices in cycles via the second communication channel, each cycle comprising a full transmission of the file data and being repeated periodically while and until it is determined that no client device of the multiple client devices has not yet received in full the file data, and such that the error correction information for determining completeness of the transmitted file data after transmission is transmitted independent of the file data.

2. The method of claim 1 wherein the step of creating a set of metadata includes storing of a metadata table by the server, the metadata table including metadata pertaining to the file data to be transmitted.

3. The method of claim 2 wherein the set of metadata further specifies properties selected from the group consisting of a message identification number, a name designated for the file data, the size of the file data, a cyclic redundancy check value and a message position.

4. The method of claim 1 wherein transmitting the set of metadata further comprises packetizing the metadata into at least one data packet conforming to an IP multicast protocol.

5. The method of claim 4 wherein transmitting the file data further comprises formulating the file data into at least one data packet conforming to an IP multicast protocol.

6. A computer-readable storage medium for performing the computer-executable steps recited in claim 1.

7. A method for receiving file data from a network by a client device, the client device being communicably linked to the network via first and second communications channels and capable of determining the completeness of the received file data, the method comprising:
    at the client device, receiving metadata specifying properties associated with the file data via the first communication channel by listening to a repeated periodic transmission of the metadata over the network;
    at the client device, receiving file data via the second communication channel once the metadata is received in its entirety by listening to a repeated periodic transmission of the file data over the network;
    after the client device receives the file data, determining, at the client device, whether the file data contains any transmission error, the determination being made according to error correction information specified by the metadata, and wherein the error correction information is received independent of the received file data; and
    storing the file data into a memory location that is accessible to the client device if the file data is without error.

8. The method of claim 7 further comprising repeating the steps of receiving, determining and storing if the file data is found to contain errors, the repeating being performed until the file data is received in its entirety without any transmission error.

9. The method of claim 7 further comprising:
    closing the first communication channel once the metadata is received by the client device in its entirety; and
    closing the second communication channel once the file data is received in its entirety without any transmission error.

10. The method of claim 7 further comprising:
    maintaining the first communication channel in an active state, the active state being maintained even once the metadata is received by the client device in its entirety, the first communication channel being usable for listening for the transmission of new metadata over the network; and
    receiving new metadata specifying properties associated with new file data via the first communication channel, wherein in response to the new metadata being received the client device aborts receiving the original data.

11. The method of claim 7 wherein receiving the metadata includes establishing a first queue in the client device and in association with the first communication channel, wherein the first queue maintains received metadata until the metadata has been received in its entirety.

12. The method of claim 11 wherein the state of the queue associated with the first communication channel triggers the closing of the first communication channel.

13. The method of claim 7 wherein the step of receiving the file data includes establishing a second queue in the client device and in association with the second communication channel, wherein the second queue maintains the received file data until the file data has been received in its entirety.

14. The method of claim 13 wherein the state of the queue associated with the second communication channel triggers the closing of the second communication channel.

15. The method of claim 7 wherein the step of determining includes performing a cyclic redundancy check.

16. A computer-readable storage medium for performing the computer-executable steps recited in claim 7.

17. A system for cyclically distributing file data to a plurality of client devices in a manner that allows the client devices to determine the completeness of the distributed file data, the plurality of client devices being communicably linked to a network via a first and second communication channel respectively, the system comprising:
- a server for maintaining the file data;
- a first communication channel to the network from the server for transmitting metadata to the plurality of devices, the metadata specifying properties associated with the file data, wherein the specified properties include at least error correction information for the file data, and wherein the error correction information is configured to be used by the plurality of client devices, after transmission of the file data, to determine the completeness of the file data;
- a second communication channel to the network from the server for transmitting the file data to the plurality of clients devices, and such that the error correction information for determining the completeness of the file data is transmitted independent of the file data transmitted over the second communication channel; and
- an executable datacaster hosted by the server for transmitting the metadata and file data in cyclical transmissions over the first and second communication channels respectively, the cyclical transmission for the first channel being repeated periodically upon the completion of a full transmission of the metadata, the cyclical transmission for the second channel being repeated periodically upon the completion of a full transmission of the file data, the cycle period for the transmission of the metadata being independent of the cycle period for the transmission of the file data.

18. The system of claim 17 further comprising a memory location accessible by the server for storing the file data.

19. The system of claim 17 further comprising a queuing mechanism operable by the server for communicating file data over the network.

20. The system of claim 17 wherein the executable datacaster further packages the metadata as one or more data packets.

21. The system of claim 17 wherein the executable datacaster further packages the file data as one or more data packets.

22. The system of claim 17 further comprising a router in communication with the server for cyclically transmitting the metadata and file data via the first and second communication channels, respectively, to the multiple client devices.

23. The system of claim 22 wherein the router is a pragmatic general multicast router.

24. A system for receiving file data transmitted over a network by a server, the server being communicably linked to the network via first and second communication channels, the file data being distributed by the server in cycles over the second communication channel, the system comprising:
- a client device comprising:
  - a first communication port for detecting the receipt of metadata from the network, the metadata being distributed by the server over the first communication port, the metadata specifying properties associated with the file data, wherein the properties include at least error indicating information for the file data;
  - a second communication port for detecting the receipt of file data from the network, the file data being distributed by the server over the second communication port, and such that the error indicating information for the file data is received independent of the file data; and
  - a receiving module for consuming the metadata and the file data as it is received at the first and second communication ports respectively, the receiving module deactivating the first communication port in response to the metadata being received in its entirety, and deactivating the second communication port in response to the file data being received in its entirety, wherein the receiving module uses the error indicating information specified in the metadata to determine whether the file data has been received in its entirety.

25. The system of claim 24 further comprising a memory location for storing the metadata and file data as it is received over the first and second communication ports respectively.

26. The system of claim 24 further comprising a first queuing mechanism in association with the first communication port, the first queuing mechanism indicating when the metadata has been received in its entirety.

27. The system of claim 24 further comprising a second queuing mechanism in association with the second communication port, the second queuing mechanism indicating when the file data has been received in its entirety.

28. The system of claim 24, the client device further comprising an error checking routine for determining whether the received file data contains any errors, wherein in response to the file data containing an error the file data is rejected, wherein in response to the file data not containing an error the file data is stored in the accessible memory location.

29. The system of claim 28 wherein the error checking routine operates according to error indicating information specified by the metadata.

30. The system of claim 24 further comprising a router in communication with the. receiving module for determining when the first and second communication ports are deactivated, the router preventing the transmission of data onto the network by the server when the first and second communication ports are deactivated.

31. A system for distributing file data over a network to multiple client devices without prior knowledge of the number of client devices or their locations on the network, the system comprising:
- means for creating metadata specifying properties associated with the file data, the properties including at least error correction information for the file data, said error correction information being configured for use by a client device, after transmission of the file data, to determine the completeness of the file data;
- means for transmitting the metadata over the network in periodic cycles over a first communication channel; and
- means for transmitting the file data over the network in periodic cycles over a second communication channel, and such that the error correction information for the file data is transmitted independent of the transmitted file data.

32. The system of claim 31 further comprising means for creating a metadata table, the metadata table including metadata pertaining to the file data to be transmitted over the network.

33. The system of claim 31 wherein said means for transmitting metadata transmits the metadata asynchronously over the first communication channel.

34. A method for transferring primary information to a plurality of recipients, each recipient being capable of using the primary information to perform a desired network or computing task, the primary information being retrieved by each recipient via a primary connection to a network, the method comprising:
- multicasting secondary information to the plurality of recipients repeatedly over a secondary connection to the network, each cycle being repeated asynchronously, the secondary information specifying properties associated with the primary information, wherein the properties include at least error correction information for the primary information, wherein the error correction information is configured for use by the recipients, after multicasting the primary data, to determine the completeness of the primary information, and wherein at least one of the plurality of recipients is capable of receiving the secondary information; and
- multicasting the primary information to the plurality of recipients repeatedly over the primary connection, wherein at least one of the plurality of recipients is capable of receiving the primary information, and such that the error correction information for determining the completeness of the primary information is multicasted independent of the primary information.

35. The method of claim 34 further comprising retrieving primary information to be transmitted to the plurality of recipients from a memory location.

36. The method of claim 34 wherein the secondary information specifies properties of the primary information selected from the group consisting of a message identification number, a name designated for the primary information, the size of the primary information, an error check value and a position indicator pertaining to the primary information.

37. The method of claim 34 wherein the step of multicasting the secondary information includes formulating the secondary information as one or more data packets conforming to a multicast protocol.

38. The method of claim 34 wherein the step of multicasting the primary information includes formulating the primary information as one or more data packets conforming to a multicast protocol.

39. A computer-readable storage medium for performing the computer-executable steps recited in claim 34.

40. A method as recited in claim 17, wherein the executable datacaster is a standalone executable.

41. A method as recited in claim 40, wherein the executable datacaster is a DLL.

42. A method as recited in claim 1, wherein the method further includes:
- determining at least one of the client devices has received in full the set of metadata.

43. A method as recited in claim 1, wherein the method further includes:
- determining at least one of the client devices has received in full the file data.

44. A method as recited in claim 24, wherein the entirety of at least one of the set of metadata and the file data is obtained over at least two different cycles.

45. A method as recited in claim 1, wherein the multiple client devices can store data on the server.

46. A method as recited in claim 22, wherein the router prevents the file data from being transmitted when no client devices are listening for the file data.

* * * * *